United States Patent Office 3,065,205
Patented Nov. 20, 1962

3,065,205
AROMATIC POLYKETONES AND PREPARATION THEREOF
Willard Hallam Bonner, Jr., Wilmington, Del., assignor to E. I. du Pont de Nemours and Company, Wilmington, Del., a corporation of Delaware
No Drawing. Filed Oct. 27, 1959, Ser. No. 848,913
12 Claims. (Cl. 260—63)

This invention relates to polyketones, and more particularly to novel aromatic polyketones and to a process for their production.

Aliphatic polyketones, such as those obtainable through the copolymerization of ethylene and carbon monoxide have been known for some time. Other predominantly aliphatic polyketones have been obtained by copolymerization of furyl vinyl ketones with acrylic acid esters as described in U.S. Patent 2,309,727. Some aromatic polyketones, wherein the ketone groups are appended to the main polymer chain, have been described in U.S. Patent 1,937,063. However, until now, no aromatic polyketone with the carbonyl groups incorporated in the main polymer chain and having a substantial degree of polymerization have been available or described in the literature. Self-condensation of phenyl acetyl chloride has been reported (Schmitt et al., Bull. Soc. Chim. France, 1955, 1033) but a polyketone of only 2 to 4 repeating units was obtained.

An object of this invention, therefore, is to provide novel predominately aromatic polyketones. Another object is to provide essentially linear, predominately aromatic, polyketones. Still another object is to provide a simple, economical process for preparing essentially linear, predominately aromatic polyketones. The foregoing and related objects will more clearly appear hereinafter.

These objects are realized by the present invention which, briefly stated, comprises reacting in an inert organic solvent under anhydrous conditions at least one aromatic compound from the group consisting of aryl ethers and polynuclear aromatic compounds, with a diacid halide from the group consisting of aromatic hydrocarbon dicarbonyl halides in which the points of attachment of the carbonyl groups are separated by at least one carbon atom, and alkylene diacid halides, in the presence of a Friedel-Crafts catalyst, and at a temperature within the range of from about 50° to about 125° C. whereby to produce an essentially linear, predominately aromatic polyketone wherein the carbonyl groups are incorporated as an integral part of the main polymer chain and are alternately separated by a recurring group (I) selected from the class consisting of diphenylene oxide and divalent polynuclear hydrocarbon groups, and a recurring group (II) selected from the class consisting of phenylene and divalent aliphatic hydrocarbon groups, said polyketone having an inherent viscosity of at least 0.15 when measured at 0.5% solids in concentrated sulfuric acid at 30° C.

In the practice of this invention various aromatic compounds may be employed, the main criterion being that the aromatic compound should contain at least two aromatic rings and preferably these should be separated from one another. Thus, aromatic compounds, such as diphenyl, dibenzyl, diphenyl methane, 2,2-diphenyl propane, diphenyl ether, dibenzofuran, carbazole, dibenzothiophene, naphthalene, anthracene, phenanthrene, perylene, fluorene, picene, chrysene, indene, and acridine are suitable for purposes of this invention.

Either an aromatic diacid chloride or an aliphatic diacid chloride may be employed. In the case of the aromatic diacid chlorides, it is essential that the points of attachment of the two carbonyl functions be separated by at least one carbon atom. Suitable aromatic diacid chlorides include terephthalyl chloride, isophthalyl chloride, 1,4-naphthoyl dichloride, 1,5-naphthoyl dichloride, 1,6-naphthoyl dichloride, anthracene-1,5-diacid chloride and anthracene-1,9-diacid chloride. As representative aliphatic diacid chlorides useful herein there may be mentioned phosgene, succinyl chloride, glutaryl chloride, adipyl chloride and sebacyl chloride.

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide and stannic chloride, can also be used.

The preferred organic solvent for the acylation reactions of this invention is nitrobenzene, in that the catalyst, such as aluminum chloride, is soluble in it. The reaction mixture remains homogeneous throughout. Other solvents, such as symmetrical tetrachloroethane, dichlorobenzene or carbon disulfide may be employed; use of carbon disulfide insures a lower reaction temperature with consequent reduction in the amount of insoluble by-products that may be formed.

The reaction may be carried out over a range of temperatures of from about 50° C. to about 125° C. In general, it is preferred to carry out the reaction at a temperature in the range of 65°–80° C. In some cases it is advantageous to carry out the reaction at temperatures as low as 0° C. and as high as 200° C.

The following specific examples will serve to further illustrate the principles and practice of this invention. Percentages are by weight unless otherwise indicated.

*Example 1*

In a three-neck 250 ml. flask equipped with a dropping funnel, mechanical stirrer, and a reflux condenser surmounted by a drying tube, the whole of which was flame dried under a current of dry nitrogen prior to use, there was introduced under anhydrous conditions, 50 ml. of nitrobenzene and 10 g. of aluminum chloride (0.075 mole). In the dropping funnel there was placed 4.25 g. of diphenyl ether (0.025 mole) and 5.07 g. isophthalyl chloride (0.025 mole) dissolved in 25 ml. of nitrobenzene. The contents of the dropping funnel were added dropwise to the stirred suspension of aluminum chloride in the reaction flask which was maintained at a temperature of 65° C. After further heating for 14 hours at this temperature, the catalyst complex was decomposed by pouring the reaction mixture into 200 ml. of methanol contained in a Waring Blendor.

The white precipitate which formed was filtered, washed successively with 10% hydrochloric acid in methanol and with two-200 ml. portions of methanol, filtered, then dried in vacuo at 65° C. The product weighed 7.0 g. (93% of theoretical). The material softened at 250° C., was soluble in m-cresol and tetrachloroethylene, indicating that an essentially linear polymer had been produced. Heating of the polymer gave a viscous melt from which long fibers couuld be drawn. An infrared spectrum showed a single carbonyl band at 1600 cm.$^{-1}$, characteristic of aryl-aryl ketones. Inherent viscosity measured at 0.5% solids in concentrated sulfuric acid at 30° C. was 0.18.

Elementary analysis.—Calculated for

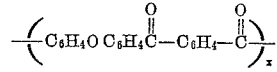

C, 80.0; H, 4.0. Found: C, 77.34; H, 4.10.

Five grams of the aromatic polyketone described above, was dissolved in a mixture of 20 ml. of concentrated sulfuric acid and 2 ml. of fuming sulfuric acid. This mixture was held at a temperature between 35° C. and 45° C. and there was added 2.1 grams of sodium azide over a period of 15 minutes while the reaction mixture was stirred. Stirring was continued for an additional 2½ hours, the reaction mixture was cooled to room temperature, a stream of air was drawn through the reaction mixture for two hours and the reaction mixture was then poured onto ice. The solid precipitate was washed free of sulfuric acid, filtered and dried. Inherent viscosity of the product was 0.18 as measured at 0.5% solids in concentrated sulfuric acid at 30° C.

A one square inch sample of the product was pressed into a film by pressing at 30 tons pressure at 285–290° C. An infrared scan showed absorption bands at 3.1, 6.1 and 6.5 microns characteristic of N-substituted primary amides.

*Example 2*

Example 1 was repeated, with an equivalent amount of terephthalyl chloride substituted for isophthalyl chloride. An 85% yield of polymer was obtained. The product had an inherent viscosity of 0.13 as measured at 0.5% solids in concentrated sulfuric acid at 30° C.

*Example 3*

Example 1 was repeated with an equivalent amount of sebacyl chloride substituted for isophthalyl chloride. A 91% yield of polymer was obtained. The polymer had a melting point of 184°–185° C., an inherent viscosity at 0.5% solids in concentrated sulfuric acid at 30° C. of 0.15. Infrared analysis showed an absorption band at 1678 cm.$^{-1}$, indicating an alkyl-aryl ketone.

Calculated for

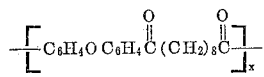

C, 78.54; H, 7.19. Found: C, 77.76; H, 7.37.

*Example 4*

Example 1 was repeated with an equivalent amount of adipyl chloride substituted for isophthalyl chloride. A 91% yield of polymer was obtained, which had a melting point of 226°–228° C. and an inherent viscosity at 0.5% solids in concentrated sulfuric acid at 30° C. of 0.23.

The infrared measurements in the foregoing examples were carried out as described in W. M. D. Bryant and R. C. Voter, J. Am. Chem. Soc. 75, 6113 (1953); and in F. W. Billmyer "Textbook of Polymer Chemistry," chapter 7, Interscience Publishers, 1957.

Inherent viscosity was measured as described by L. H. Cragg, Journal of Colloid Science, I, 261–269 (1946).

*Example 5*

Under anhydrous conditions, 10.15 g. (.05 mole) of isophthalyl chloride, 17.0 g. of SbCl$_5$ (.057 mole—Baker analytical reagent grade) and 80 ml. of distilled nitrobenzene were placed in a 300 ml. round-bottomed, 3-necked flask fitted with a sealed stirrer, nitrogen inlet and outlet, a thermometer and an addition funnel with a pressure-equalizing bypass. In this funnel there was placed a solution of 8.51 g. (.05 mole) of diphenyl ether dissolved in 20 ml. of dry nitrobenzene. The reaction mixture was stirred for 30 minutes at 25° C. after which it was heated for 3 hours at 80° C. and 1 hour at 100° C. The product was removed from the reaction flask and washed with 400 ml. of ethanol acidified with 20 ml. of concentrated hydrochloric acid, after which the product was dried in a vacuum oven at 80° C. The product was dissolved in concentrated sulfuric acid, in which it produced a dark red solution, and the sulfuric acid solution was then poured onto an ice-water mixture to precipitate a yellow solid. The product was dried overnight at 70° C. in a vacuum oven. The product had an inherent viscosity at 0.5% solids in concentrated sulfuric acid at 30° C. of 0.16.

*Examples 6–16*

Following the procedure described in Example 5, aromatic polyketones were prepared from the following:

Biphenyl and isophthalyl chloride with aluminum chloride catalyst.
Biphenyl and isophthalyl chloride with aluminum chloride catalyst and with dichlorobenzene as the solvent in place of nitrobenzene.
Biphenyl and isophthalyl chloride with ferric chloride as catalyst.
Diphenyl ether and isophthalyl chloride with SbCl$_5$ catalyst.
Diphenyl ether and isophthalyl chloride with aluminum chloride catalyst.
Diphenyl methane and isophthalyl chloride with aluminum bromide catalyst.
Diphenyl methane and isophthalyl chloride with aluminum chloride catalyst.
Biphenyl and terephthalyl chloride with SbCl$_5$ catalyst.

The products were highly colored solids and had inherent viscosities ranging from 0.13 to 0.18 as measured at 0.5% solids in concentrated sulfuric acid at 30° C.

I claim:

1. A process for preparing essentially linear, substantially aromatic polyketones which comprises reacting an inert organic solvent under anhydrous conditions at least one aromatic compound from the group consisting of aryl ethers and polynuclear aromatic hydrocarbons, with a diacid halide from the group consisting of aromatic hydrocarbon dicarbonyl halides in which the points of attachment of the carbonyl groups are separated by at least one carbon atom, and alkylene diacid halides, in the presence of a Friedel-Crafts catalyst, and at a temperature within the range of from about 50° to about 125° C.

2. The process of claim 1 wherein the solvent is nitrobenzene.

3. The process of claim 1 wherein the solvent is carbon disulfide.

4. The process of claim 1 wherein the catalyst is aluminum chloride.

5. The process of claim 1 wherein the aromatic compound is diphenyl ether.

6. The process of claim 1 wherein the aromatic compound is biphenyl.

7. A process for preparing essentially linear substantially aromatic polyketones which comprises reacting in nitrobenzene under substantially anhydrous conditions at least one aromatic compound from the group consisting of aryl ethers and polynuclear aromatic hydrocarbons, with a diacid halide from the group consisting of aromatic hydrocarbon dicarbonyl halides in which the points of attachment of the carbonyl groups are separated by at least one carbon atom, and alkylene diacid halides, in the presence of aluminum chloride, and at a temperature within the range of from 65° to 80° C.

8. An essentially linear aromatic polyketone wherein the carbonyl groups are incorporated as an integral part of the main polymer chain and are alternately separated by a recurring group (I) selected from the class consisting of diphenylene oxide and divalent polynuclear hydrocarbon groups, and a recurring group (II) selected from the class consisting of phenylene and divalent aliphatic hydrocarbon groups, said polyketone having an inherent viscosity of at least 0.15 when measured at 0.5% solids in concentrated sulfuric acid at 30° C.

9. A process for preparing an essentially linear substantially aromatic polyketone which comprises reacting in nitrobenzene under substantially anhydrous conditions equivalent amounts of diphenyl ether and isophthalyl chloride in the presence of aluminum chloride, and at a temperature within the range of from about 65° to 80° C.

10. A process for preparing an essentially linear substantially aromatic polyketone which comprises reacting in nitrobenzene under substantially anhydrous conditions equivalent amounts of diphenyl ether and terephthalyl chloride in the presence of aluminum chloride, and at a temperature within the range of from about 65° to 80° C.

11. A process for preparing an essentially linear substantially aromatic polyketone which comprises reacting in nitrobenzene under substantially anhydrous conditions equivalent amounts of diphenyl ether and sebacyl chloride in the presence of aluminum chloride, and at a temperature within the range of from about 65° to 80° C.

12. A process for preparing an essentially linear substantially aromatic polyketone which comprises reacting in nitrobenzene under substantially anhydrous conditions equivalent amounts of diphenyl ether and adipyl chloride in the presence of aluminum chloride, and at a temperature within the range of from about 65° to 80° C.

References Cited in the file of this patent

UNITED STATES PATENTS

| | | |
|---|---|---|
| 2,275,447 | Lieber et al. | Mar. 10, 1942 |
| 2,500,082 | Lieber et al. | Mar. 7, 1950 |
| 2,551,050 | Parkston | May 1, 1951 |
| 2,873,299 | Mikeska | Feb. 10, 1959 |